United States Patent
Schwarz

[15] 3,672,284
[45] June 27, 1972

[54] PHOTOGRAPHIC CAMERA

[72] Inventor: Gerhard Schwarz, Schaffhauserstrasse 12, 8 Munich, 49, Germany

[22] Filed: Aug. 4, 1970

[21] Appl. No.: 60,898

[30] Foreign Application Priority Data

Aug. 19, 1969 Germany..................P 19 42 119.3

[52] U.S. Cl..........................................95/42, 355/1, 355/68
[51] Int. Cl. .............................................................G03b 19/12
[58] Field of Search..........................95/42 R; 355/1, 68, 83

[56] References Cited

UNITED STATES PATENTS

| | | | |
|---|---|---|---|
| 3,280,714 | 10/1966 | Gunther et al. | 95/42 R |
| 3,114,283 | 12/1963 | Gruner | 355/1 |
| 3,540,363 | 11/1970 | Ono | 95/42 R |

*Primary Examiner*—Samuel S. Matthews
*Assistant Examiner*—E. M. Bero
*Attorney*—Charles Shepard and Stonebraker & Shepard

[57] ABSTRACT

A photographic camera having a light sensitive element (e.g., a photoresistance of a photocell) for measuring the intensity of a particular beam of incoming light, such as the light coming through the photographic lens, when the construction is used with a single lens mirror reflex camera. The light sensitive element is not in the path of but is offset from the beam of light to be measured. Light from the beam to be measured is transmitted to the light sensitive element through a cable of optical fibers, the output end of the fibers being at the light sensitive element, and the input end thereof lying in the path of the beam of light to be measured, for example lying behind a partially reflecting and partially transmitting portion of the reflex mirror. When the mirror is in the viewing position, the input end of the cable or bundle of fibers receives light from the incoming beam and transmits such light to the light sensitive element. When the mirror is swung up to the picture taking position, the light transfer between the input end of the bundle of fibers and the light sensitive element is interrupted. The light sensitive element is in an electric circuit performing a metering or controlling function, and this circuit includes a switch closed to make the circuit operative when the mirror is in the viewing position, and opened to make the circuit inoperative when the mirror is swung up to the picture taking position.

5 Claims, 2 Drawing Figures

Fig.1
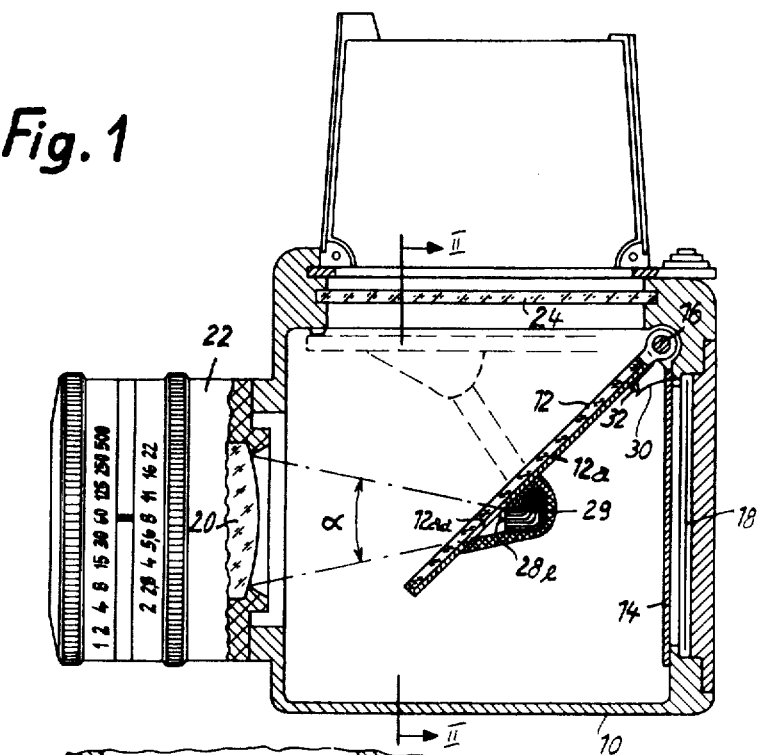
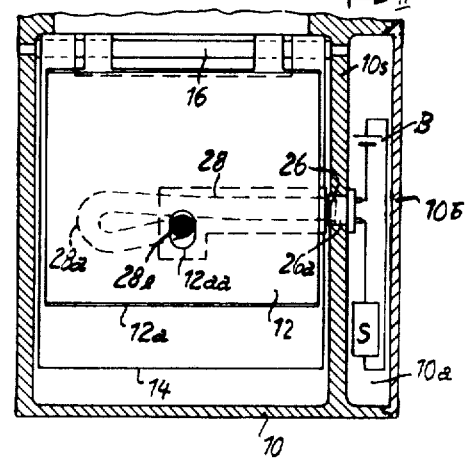
Fig.2

PHOTOGRAPHIC CAMERA

BACKGROUND OF THE INVENTION

It is known in the art to provide a photographic camera with a light sensitive element such as a photocell or photoresistance, for measuring the incoming light from the subject to be photographed, and controlling a meter or controlling an exposure factor (e.g., the size of the diaphragm aperture, or the length or duration of the exposure) in accordance with the measured light.

In the prior art devices of this character, the light responsive or light measuring element has usually been mounted in the direct path of light incoming from the subject to be photographed; that is, either the light coming through the photographic lens, in the case of single lens reflex cameras, or light coming through some other window or opening, such as light coming into a finder chamber or into a special inlet opening provided only for the light sensitive element. This is not entirely satisfactory. Particularly in the case of single lens mirror reflex cameras, it is desirable to take the measurement of light from the beam of light which comes in through the main photographic lens when the reflex mirror is in viewing position. But is the light sensitive element is mounted permanently in a position to be responsive to the light entering through the photographic lens, there is danger that it may interfere to some extent with the passage of light to the film during the exposure, and there is the further danger that the element may be affected to some extent by light which enters the chamber through the finder screen or viewing screen, thus producing an inaccurate reading.

An object of the invention is the provision of a generally improved and more satisfactory camera having a light sensitive or light responsive element so mounted as to be subject only to light which enters through the photographic lens, without being affected by light from any other source when the parts are in viewing and light-measuring position, and also being so mounted as to be completely out of the way of the photographic beam of light when an exposure is to be made.

Another object of the invention is the provision of a camera having the above mentioned characteristics, wherein the electric circuit controlled by the light responsive element is inoperative or ineffective except when the parts are in proper position to supply the light responsive element with light coming only from the beam of light entering through the lens.

Still another object is the provision of a camera having a simple and effective construction for transmitting the desired light from the incoming beam of light to be measured, to a light sensitive or light responsive element which is offset out of the beam of light.

A still further object is the provision of a camera construction fulfilling the above objects in a simple and inexpensive way, by using a flexible bundle of optical fibers for transmitting the light from the beam which is to be measured to the light responsive element offset from such beam.

BRIEF DESCRIPTION OF THE DRAWINGS

FIG. 1 is a view partly inside elevation and partly in axial vertical section through a camera in accordance with a preferred embodiment of the invention; and FIG. 2 is a transverse section approximately on the line II—II of FIG. 1.

DESCRIPTION OF THE PREFERRED EMBODIMENT

In the preferred embodiment, the camera has a main housing or casing 10 containing the reflex mirror 12 mounted in the holder or backing plate 12a. The mirror holder, and also the cover plate or film-protecting flap 14, are mounted to swing on the pivot 16, in the usual manner familiar to those skilled in the art of single lens reflex cameras. The film 18, moved in the usual way by conventional film feeding mechanism, lies behind the protecting flap 14 when the parts are in the viewing position illustrated in the drawings. When the mirror and the flap 14 are swung upwardly to a horizontal position at the top of the chamber within the camera, then the light entering through the lens 20 may reach the film 18 to make the exposure. The lens 20 is mounted in the usual housing 22 which contains also the objective shutter blades and the diaphragm leaves.

Arranged above the mirror, at the top of the camera housing, is the usual conventional focusing screen or viewing screen 24. When the parts are in the viewing position illustrated, light entering through the lens (the shutter being then open) is reflected by the mirror 12 up to the focusing screen 24, where it is viewed in the usual way by the photographer, looking down at the screen through a collapsible hood or shadow box.

The two main variable exposure factors of diaphragm aperture and shutter speed, must be adjusted in accordance with the light conditions and other conditions prevailing at the time of the exposure. Usually one of these factors is adjustable manually, and the other factor is set either manually or automatically. The present invention is useful regardless of whether only one factor or both factors are set manually, and regardless of which factor is set manually if the other one is set or adjusted automatically.

For example, the factor of diaphragm aperture may be set manually. If the light responsive element of the present invention is in an electric circuit controlling a light meter, the other factor (shutter speed, or duration of exposure) may also be set manually in accordance with the indications of the light meter. Or if the light responsive element of the present invention is in a circuit of known kind for automatically setting the other factor, then the other factor is automatically set thereby.

The light responsive element, according to the present invention, may be either a photocell or, preferably, a photoresistance. It is indicated schematically at 26, and it is to be particularly noted that this element 26 is not in the path of light entering through the lens 20, but is considerably offset from the path or beam of such light, preferably being located on a side wall of the camera and held in place by a body 26a firmly mounted on the side wall 10s.

The photoresistance 26 has plug contacts to enable it to be connected in an electric circuit including a battery B and an electronic switching system or circuit schematically indicated at S. The battery and the circuit are installed in a side chamber 10a of the camera housing 10, which chamber is closed by a removable door 10b which can be removed to obtain access to the battery for replacement, or to the electronic circuit for servicing or adjustment.

The carrier 12a of the reflex mirror 12 has an opening through it in line with the optical axis, as shown at 12aa. Either the entire mirror 12, or at least that part thereof in front of the opening 12aa, is semi-transparent, that is, partially reflecting and partially transmitting, part of the light coming in through the lens 20, during a viewing operation, will be transmitted through the mirror and through the opening 12aa to reach the input end of a light guide in the form of a flexible rod or bundle 28 of light conducting fibers, such fibers being well known per se to those familiar with the optical field called fiber optics. The leading or input end of this rod or bundle of optical fibers is secured to the rear face of the mirror carrier 12a by means of a mass 29 of fastening material. The bundle 28 itself constitutes a freely floating loop 28a, the exit or output end of which is connected in a similar manner to the side wall 10s of the camera adjacent the light responsive element 26, in such a way that the light emerging from this end of the bundle of fibers is directed to and falls upon the light responsive element 26. The length of the loop 28a is such that the rod or bundle of fibers does not obstruct the pivotal movements of the mirror 12 in any way.

The inlet or light-incident opening 28e at the inlet end of the rod or bundle is so shaped and so placed that the optical fibers will accept and conduct only light within the angle or cone of rays indicated at a. Undesired light rays from other directions, for example the light which is incident on the focusing screen 24 and is reflected thereby, are not accepted by the rod or bundle 28 and are not conducted to the photosensitive element 26. Thus the light received by the photoresponsive element 26 is a true measure of the brightness of the photographic scene or object to be photographed, so as to give a true measurement and indication, not affected by light coming from other sources or from other directions.

At the end of the viewing operation, when the reflex mirror 12 is swung up into the dotted line position ready for making the actual exposure, there will be a weak pencil of light coming through the focusing screen 24 and into the inlet end of the optical fiber rod, conducted thereby to the light sensitive element 26. In order to avoid any possible false indication resulting from the light transmitted at this time, means is provided to prevent the photosensitive element 26 from influencing the meter or the control circuit, as the case may be, when the mirror 12 is in any position other than the correct viewing position where the optical fibers receive light from and only from the desired beam coming through the lens 20. This may be accomplished by incorporating, in the unit or circuit schematically shown at S, a switch which is closed only when the mirror 12 is down in its correct viewing position, and is open to render the circuit ineffective as soon as the mirror begins to swing up from its correct viewing position. For example, there may be a contact member 32 mounted on and swinging with the mirror holder 12a, making contact with the companion contact spring 30 to close the switch and complete the circuit, when and only when the mirror is swung fully to its correct viewing position.

As briefly mentioned above, the light responsive or light sensitive element 26 may control a light meter, to be observed by the photographer for aid in setting the variable exposure factors manually, or may control a circuit for automatically setting one of the exposure factors, such as the shutter speed or duration of exposure. In the drawing, the element S is intended to represent schematically either the circuit of a light meter, or the electronic circuitry for controlling or setting an exposure factor such as shutter speed, various forms of such electronic circuitry being known in the art, the details thereof being immaterial so far as the present invention is concerned. Merely as one possible example of such circuitry, the light responsive element 26 may be a photoresistance and the circuitry may be the same as that disclosed in pending German patent application no. P 19 38 826.2, filed July 30, 1969, and its corresponding United States patent application, Ser. No. 57,038, filed July 22, 1970 in the name of Paul Fahlenberg, and beneficially owned by the beneficial owner of the present application.

What is claimed is:

1. A photographic camera comprising lens means for directing a beam of light along a path toward a photographic film to make an exposure thereon, a light responsive element for measuring the intensity of incident light, said element being located outside of said path, and light conducting optical fibers having light receiving input ends located within said path when a measurement of light intensity is to be made and having output ends located outside said path in the vicinity of said element and arranged to direct to said element the light received at said input ends and conducted along said fibers, characterized by the fact that said input ends of said fibers are so shaped and so placed as to accept and conduct only light from within a truncated cone whose larger base is the maximum aperture of the rear end of said lens means and whose smaller base is the area occupied by said input ends of said fibers.

2. A construction as defined in claim 1, in which said input portions of said fibers are located approximately in the center of said beam of light when a measurement of light intensity is to be made, and means for moving said fibers entirely out of said beam of light when an exposure is to be made.

3. A construction as defined in claim 1, in which said camera is a single lens mirror reflex camera having a mirror movable between a viewing position in said beam of light and an exposure position out of said beam of light, and in which said input ends of said optical fibers are connected to said mirror to move therewith into and out of said beam of light.

4. A construction as defined in claim 3, in which at least a portion of said mirror near the center of said beam of light when the mirror is in viewing position, is semitransparent so as to reflect part of the light falling thereon and to transmit another part of such light through said mirror, said input ends of said optical fibers being mounted on the rear of said mirror to receive light transmitted through the mirror.

5. A construction as defined in claim 1, in which said camera is a single lens mirror reflex camera having a reflex mirror swingable in an exposure chamber, said exposure chamber having a side wall, and in which said light responsive element is mounted on said side wall, and in which said light conducting optical fibers are in the form of a flexible rod of fibers, the input end of which rod is mounted on and movable with said mirror, and the output end of which rod is mounted on said side wall in position to deliver light to said light responsive element.

* * * * *

UNITED STATES PATENT OFFICE
CERTIFICATE OF CORRECTION

Patent No. 3,672,284      Dated June 27, 1972

Inventor(s) Gerhard Schwarz

It is certified that error appears in the above-identified patent and that said Letters Patent are hereby corrected as shown below:

On the cover sheet insert -- [73] Assignee Compur-Werk Gesellschaft mit beschrankter Haftung & Co. --.

Signed and sealed this 19th day of December 1972.

(SEAL)
Attest:

EDWARD M. FLETCHER, JR.      ROBERT GOTTSCHALK
Attesting Officer      Commissioner of Patents